Dec. 22, 1953   P. D. KESSLER   2,663,410
MANUFACTURE OF SMOOTHBORE GUN BARRELS
Filed Sept. 29, 1950   2 Sheets-Sheet 1
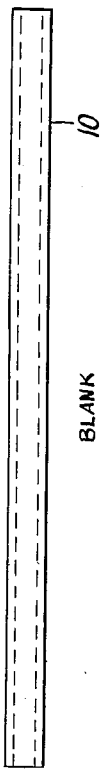
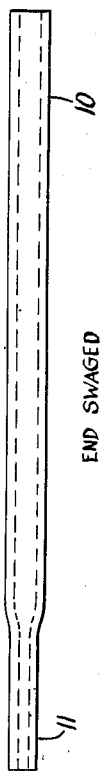
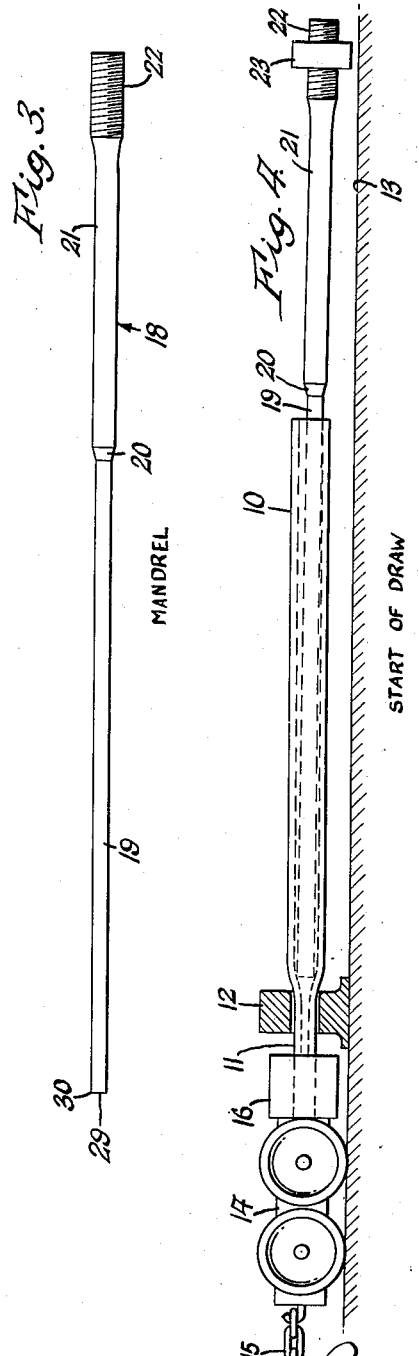
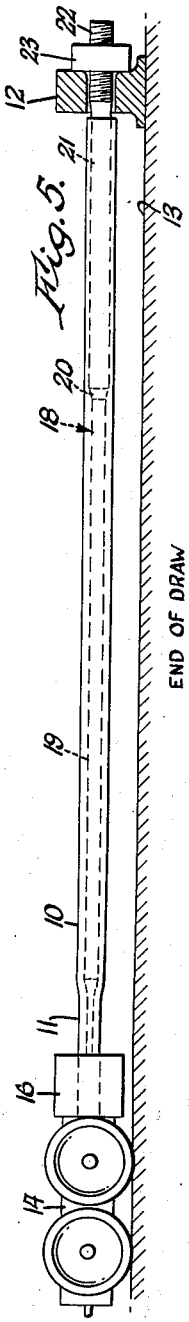
INVENTOR.
Paul D. Kessler
BY
Popp and Sommer
ATTORNEYS.

Dec. 22, 1953 P. D. KESSLER 2,663,410
MANUFACTURE OF SMOOTHBORE GUN BARRELS
Filed Sept. 29, 1950 2 Sheets-Sheet 2
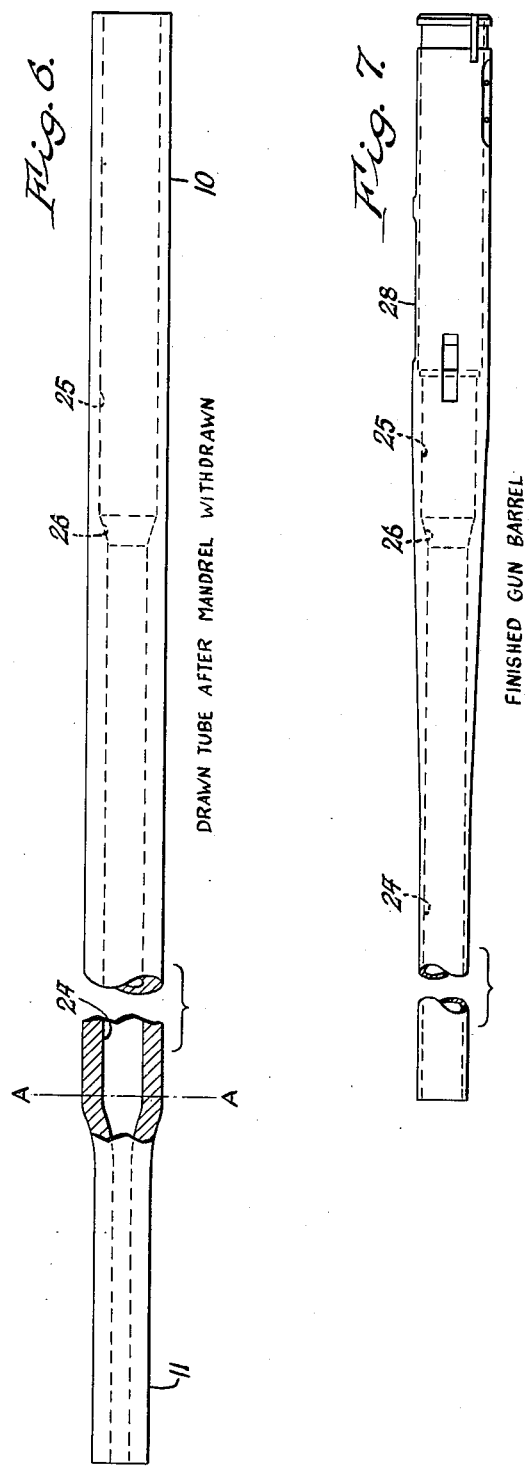
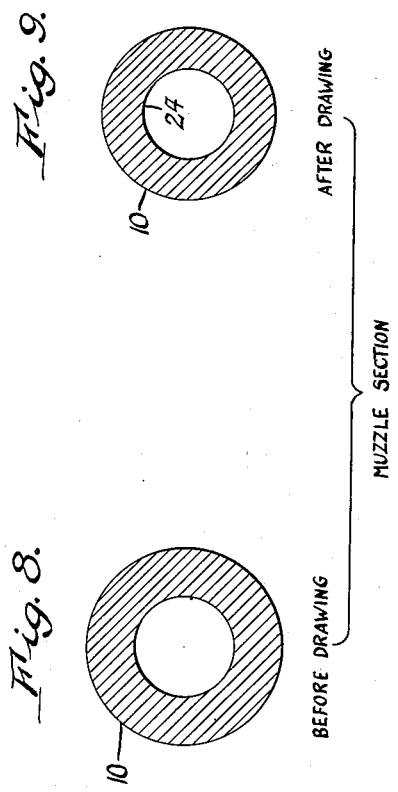
INVENTOR.
Paul D. Kessler
BY
Popp and Sommer
ATTORNEYS.

Patented Dec. 22, 1953

2,663,410

UNITED STATES PATENT OFFICE 2,663,410

MANUFACTURE OF SMOOTHBORE GUN BARRELS

Paul D. Kessler, Silver Creek, N. Y.

Application September 29, 1950, Serial No. 187,561

3 Claims. (Cl. 205—8)

This invention relates to the manufacture of smooth bore gun barrels and more particularly to a method of manufacturing shotgun barrels.

As conventionally manufactured, shotgun barrels involve extensive drilling, boring, reaming and honing operations to produce the bore. This procedure requires a wide variety of machine tools and is time consuming all of which results in a high cost of production.

The principal object of the present invention is to eliminate all of the aforementioned costly machining operations and to produce a relatively thick walled gun barrel with a finished smooth bore in a single pass cold drawing operation thereby resulting in outstanding savings as compared with conventional practices.

Another object is to provide such a cold drawing method which is not required to be carried out on a specially designed machine tool but can be carried out on a conventional draw bench or broach machine.

Another object is to provide such a method which permits gun barrels to be manufactured of a higher strength steel than is commercially feasible with machined bore barrels since metal cutting is eliminated with the practice of the present invention and therefore there is no need to favor use of a steel with a relatively high content of phosphorous and sulfur, which reduce strength, to facilitate machining.

Another object is to provide such a method which produces a smooth bore gun barrel in which the internal surface of the drawn gun barrel is automatically burnished and case hardened and the metal in the barrel is cold worked to improve its strength.

Other objects and advantages of the invention will be apparent from the following description and drawings in which:

Fig. 1 is a diminutive side elevational view of a length of tube to be formed into a shotgun barrel in accordance with the invention.

Fig. 2 is a similar view but showing one end of the tube reduced in diameter.

Fig. 3 is a side elevational view of a mandrel over which the tube is cold drawn.

Fig. 4 is a side elevational view of the tube with the mandrel arranged therein and with this assembly arranged on a conventional chain draw bench which is diagrammatically and fragmentarily illustrated in this figure, this figure showing the relation of the members at the beginning of the draw.

Fig. 5 is a view similar to Fig. 4 and showing the relation of the members at the end of the draw.

Fig. 6 is an enlarged side elevational view, partly in section, of the drawn tube after the mandrel has been withdrawn therefrom.

Fig. 7 is a view similar to Fig. 6 and showing the drawn tube after it has been externally machined to provide a finished shotgun barrel.

Figs. 8 and 9 are approximately full size cross-sectional views of the tube at the muzzle region thereof before and after drawing respectively.

The tubular stock used to form shotgun barrels in accordance with the invention, is preferably tube reduced stock of the desired dimensions and having a relatively thick wall as shown in Fig. 8. Tube reduced stock is cylindrical tubular steel stock which has been reduced in diameter by a cold swaging operation on a conventional tube reducer and is commercially available. The tube reduced stock is composed of a steel which is preferably low in phosphorous and sulfur content and therefore of higher strength than is conventionally used in machined bore shotgun barrels and further the cold working of the stock on the tube reduced improves the physicals of the stock. The tube reduced stock is preferably then annealed in a hydrogen atmosphere to eliminate scale. Thereafter the annealed tube reduced stock is cut to predetermined lengths depending on the gauge and length of shotgun barrels desired to be produced. One such predetermined length of tube or blank is illustrated in Fig. 1 and represented by the numeral 10.

The tube or blank 10 is then reduced at one end to provide a tag 11 as shown in Fig. 2. The tag 11 is a cylindrical coaxial extension for the main body of the tube or blank to facilitate holding the same and is preferably provided by cold swaging the end portion of the tube or blank.

The swaged tube or blank 10 is then preferably given a conventional acid etch by immersion in a hydrochloric, nitric or sulfuric acid bath, followed by a cold water rinse, then immersed in a dichromate bath and finally into a limewater bath. The tube or blank is so treated to better hold a lubricant applied to its surfaces to facilitate the drawing operation. The lubricant may be any conventional drawing compound and is preferably applied by immersing the tube or blank therein.

Following this, the tag end 11 of the lubricant coated tube or blank 10 is inserted through the cylindrical die opening of a female die 12. Referring to Fig. 4, this female die 12 is shown as rigidly arranged on the bed 13 of a conventional draw bench. Such a machine is provided with a carriage 14 movably arranged on the bed 13 for rectilinear travel in a direction parallel with the axis of the opening of the female die 12. The carriage 14 is adapted to be pulled away from the female die 12 by a chain 15 and this chain is driven by a power drive mechanism (not shown). The carriage 14 is shown as having a chuck device 16 of any suitable construction which receives the tag end 11 of the tube or blank 10 and has jaw members which engage the tag and prevent withdrawal of the tag from the chuck during the subsequent drawing operation.

Before or after the tube or blank 10 has been so mounted, a mandrel 18 is arranged within the bore thereof as shown in Fig. 4. Referring to Fig. 3, the mandrel 18 is shown as an elongated round rod having a relatively thin and long tapered end section 19, a very short relatively abruptly tapered intermediate section 20 and a relatively thick and long tapered end section 21. The outer end of this last mentioned section 21 gradually enlarges into an externally threaded section 22. A collar 23 is adapted to be screwed onto the threaded section as shown in Fig. 4.

Referring to Figs. 6 and 7 it is important to note that the external surfaces of the tapered sections 19, 20 and 21 are formed to diameters which will be the final diameters of the bore 24 and chamber 25 of the finished gun barrel. The tapered section 19 corresponds to the main bore 24 of the finished gun barrel between the muzzle and chamber 25 thereof and the intermediate tapered section 20 provides a short taper 26 in the gun barrel connecting the chamber 25 and the breech end of this main bore 24. The tapered end section 21 of the mandrel produces the bore for the chamber 25 of the gun barrel and the rear portion of this bore is subsequently machined to a larger diameter to provide the receiver 28 for the breech closing mechanism (not shown).

The peripheral surfaces of the sections 19, 20 and 21 of the mandrel are therefore very carefully formed and smooth and free of scratches or defects since such defects or any irregularities will be reproduced in the surface of the bores 24, 25 and 26 of the drawn gun barrel.

It is also important to note that the outer end face 29 of the tapered section 19 of the mandrel 18 lies in a transverse plane at right angles to the longitudinal axis of the mandrel so as to provide a sharp annular corner 30.

Referring again to the procedural aspects of the invention, the mandrel 18 is coated with drawing compound and inserted into the bore of the tube or blank 10 until the corner 30 bottoms or engages the inner surface of the gradually contracting or inner end portion of the tag end 11, as shown in Fig. 4. The mandrel reposes in the tube as a free member. In this condition it will be noted that the outer portion 21 of the mandrel 18 projects a substantial distance from the end of the tube or blank. Likewise the collar 23 is arranged a substantial distance from this end face of the tube or blank.

With the inlet side of the die opening of the female die 12 well packed with drawing compound, the carriage 14 is pulled by the chain 15 away from this die. This causes the wall of the tube or blank 10 to be contracted into intimate contact with the peripheral surfaces of the mandrel 18 and at the same time metal of the tube or blank is displaced longitudinally along the mandrel. It has been found that by providing the sharp corner 30 on the end of the mandrel, the mandrel does not shift longitudinally in the tube or blank when the tube and mandrel begin to move through the die. However, if this corner is not square as shown but rounded or beveled, the mandrel will be forcibly ejected from the tube or blank when the drawing commences unless special means are provided to hold the mandrel from being so ejected.

The drawing operation continues until the metal in the full length of the gradually elongating tube or blank 10 has been laid down on the mandrel 18. Elongation of the tube due to drawing is in the order of 9 inches for a shotgun barrel. When this occurs the trailing or rear end face of the drawing tube is adjacent the leading or front face of the collar 23 on the mandrel. The drawing operation proceeds continuously, smoothly and rapidly at a uniform speed of travel of the carriage 14. All during the drawing step the mandrel centers itself in the bore of the tube as it enters the die opening and therefore the concentricity of the drawn tube depends upon the concentricity of the inner and outer surfaces of the tube before drawing. Fig. 9 represents the appearance of the drawn tube in cross section at the muzzle.

An important feature of the invention is that the mandrel 18 is withdrawn rectilinearly and without twisting from the drawn tube and preferably as a continuous part of the drawing operation. Referring to Fig. 5, it will be seen that as the rear or trailing end of the drawn tube leaves the die opening of the female die 12, the front or leading face of the collar 23 engages the opposing face of the female die which serves as an abutment for the collar. At this movement, the resistance to movement or load on the carriage 14 is suddenly removed while the pulling force exerted by the chain 15 is still being applied. This causes the carriage 14 to jump forward and forcibly slam the collar 23 against the immovable female die 12. The effect is to apply an axially directed impact force to the mandrel 18 which operates to withdraw the mandrel from the drawn tube.

The application of an impact force to withdraw the mandrel from the drawn tube is essential. If a force is gradually applied to the mandrel to pull the same from the drawn tube, experience has taught that the mandrel breaks whereas the mandrel does not break when an impact force is applied to effect separation of the mandrel and drawn tube and the same mandrel can be used repeatedly. It is to be noted that the mandrel is not twisted relative to the drawn tube during separation since this would tend to scratch or mar the surface of the bore of the drawn tube.

Due to the displacement of a considerable volume of metal during the drawing operation, heat due to molecular friction is developed which in part is absorbed by the mandrel. Starting with the tube or blank and mandrel both at room temperature, at the end of the drawing operation these members will be too hot to grasp by bare hand. It has been found that the mandrel must be withdrawn from the drawn tube while both are in this heated condition. If allowed to cool before the mandrel is attempted to be withdrawn even by an impact force, the mandrel breaks. This is believed to be due to the shrinkage of the drawn tube onto the mandrel. It is therefore essential that the mandrel and drawn tube be separated promptly after the tube has been drawn and preferably effected as a continuation of the drawing pass.

Also facilitating the withdrawal of the mandrel from the drawn tube is the draft or taper which is provided on the mandrel. The specifications for shotgun barrels of different gauges permit certain manufacturing tolerances in the diameter of the bore of the barrel. This manufacturing tolerance is utilized in the practice of the present invention by building the tolerance into the taper of the mandrel. Thus if a tolerance of ±.005 inch is permitted for an open or cyclindrical bore 26 inches long, the maximum dimension will be the diameter of the mandrel tapered end section 19 at the inner end thereof and the minimum dimension, .010 inch shorter, will be the diameter of the outer end of the tapered section 19. This provides a slight but sufficient draft of about .0004 inch per lineal inch of bore. Because of the high compression of the metal of the tube to the periphery of the mandrel, the bore of the drawn tube conforms dimensionally with the mandrel to within about .0001 inch.

Shotgun barrels are also provided with what are known as "chokes" to concentrate the shot pattern. Usually, a shotgun is choked by boring a taper in the muzzle end of the barrel, or swaging the muzzle end, or attaching a choke sleeve. It is a feature of the present invention that the choke effect, whether full or modified, can be incorporated uniformly or otherwise into the taper of the end section 19 of the mandrel. In fact this serves to increase the draft of the mandrel. Thus it is equally facile to manufacture gun barrels with full choke, modified choke or improved cylindrical bores in accordance with the practice of the present invention, it merely being necessary to use the mandrel having the appropriate taper in its end section 19 to produce the type of bore desired.

After the mandrel 18 is withdrawn from the drawn tube, the latter is removed from the chuck 16. The tag end 11 of the drawn tube can then be cut off in any suitable manner along the line A—A as shown in Fig. 6. This completes the operations on the bore of the gun barrel, the bore being smooth, finished, accurate and ready for use.

However, to complete the gun barrel, the same is externally machined to reduce the wall thickness and the receiver portion machined to provide a final construction such as is illustrated in Fig. 7. While the receiver and barrel portions are shown there as integral extensions one of the other, it will be understood that the barrel portion can be manufactured in accordance with the present invention as a separate part, thereafter to be united with a separately manufactured receiver part. All such subsequent external machining operations can be based on the outside diameter of the drawn tube since the inner and outer peripheral surfaces of the tube are concentric or close enough so from a practical point of view. Further it has been found that such external machining does not adversely affect the bore form of the drawn tube.

While the drawing method has been illustrated as carried out on a conventional chain draw bench, it is to be clearly understood that the method can be carried out on any suitable apparatus which will produce the impact force necessary to withdraw the mandrel from the drawn tube. Also, if desired, the tube or blank with the mandrel arranged therein can be held stationary and the female die moved longitudinally along the tube to effect the drawing thereof.

From the foregoing it will be seen that the present invention provides a simple, expeditious, efficient and inexpensive method of producing smooth bore gun barrels by a single pass cold drawing operation.

I claim:

1. The method of producing a smooth bore gun barrel, which comprises inserting a mandrel into a relatively thick walled cylindrical tube, drawing said tube and mandrel through the cylindrical opening of a die which has a diameter smaller than that of said tube so as to contract the tube onto said mandrel and also to elongate the tube therealong, and while the drawn tube and mandrel are still heated due to the heat developed by the displacement of metal during the drawing operation applying an axially directed impact force to withdraw said mandrel from said drawn tube.

2. The method of producing a smooth bore gun barrel, which comprises inserting an elongated mandrel into the bore of a relatively thick walled cylindrical tube, pulling said tube with said mandrel arranged therein through the cylindrical opening of a die which has a diameter smaller than that of said tube so as to contract the tube onto said mandrel to reproduce the external contour of said mandrel and also to elongate the tube along said mandrel, and without interrupting the movement of said tube relative to said die applying an axially directed impact force to said mandrel in the opposite direction to withdraw said mandrel from said drawn tube.

3. The method of producing a smooth bore gun barrel, which comprises inserting a mandrel into the bore of a relatively thick walled cylindrical tube having a reduced tag end until the inserted end of said mandrel bottoms adjacent said tag end, said mandrel having a length greater than that of the unreduced portion of said tube, pulling said tube by said tag end and with said mandrel moving with said tube through the cylindrical opening of a die which has a diameter smaller than that of said tube so as to lay the metal of said tube on and along said mandrel, and while the drawn tube and mandrel are still heated due to the heat developed by the displacement of metal during the drawing operation applying an axially directed impact force to the exposed end of said mandrel in a direction opposite to the direction of pull on said tube to withdraw said mandrel from the drawn tube.

PAUL D. KESSLER.

References Cited in the file of this patent

UNITED STATES PATENTS

| Number | Name | Date |
| --- | --- | --- |
| 441,927 | Bray | Dec. 2, 1890 |
| 1,316,509 | Rose | Sept. 16, 1919 |
| 1,422,974 | Higgins | July 18, 1922 |
| 1,461,129 | Loomis | July 10, 1923 |
| 2,306,712 | Poncar | Dec. 29, 1942 |

FOREIGN PATENTS

| Number | Country | Date |
| --- | --- | --- |
| 573,898 | Germany | Apr. 6, 1933 |